(12) United States Patent
Dolph (10) Patent No.: US 8,516,014 B2
(45) Date of Patent: Aug. 20, 2013

(54) SEGMENTED PROCESSING OF DATA RECORDINGS

(75) Inventor: Blaine H. Dolph, Western Springs, IL (US)

(73) Assignee: International Business Machines Corporation, Armonk, NY (US)

(*) Notice: Subject to any disclaimer, the term of this patent is extended or adjusted under 35 U.S.C. 154(b) by 2480 days.

(21) Appl. No.: 10/887,437

(22) Filed: Jul. 8, 2004

(65) Prior Publication Data

US 2006/0008242 A1    Jan. 12, 2006

(51) Int. Cl.
*G06F 17/30*    (2006.01)

(52) U.S. Cl.
USPC ........... 707/805; 707/804; 707/809; 707/810; 707/811

(58) Field of Classification Search
USPC ...................................... 707/104.1
See application file for complete search history.

(56) References Cited

U.S. PATENT DOCUMENTS

| | | | |
|---|---|---|---|
| 5,355,229 A | 10/1994 | Arano et al. | 358/343 |
| 6,011,663 A * | 1/2000 | Inoue et al. | 360/48 |
| 6,121,963 A * | 9/2000 | Ange | 715/202 |
| 6,724,703 B2 * | 4/2004 | Nakahara et al. | 369/47.23 |
| 2002/0049974 A1 * | 4/2002 | Shnier | 725/47 |
| 2002/0092021 A1 | 7/2002 | Yap et al. | 725/55 |
| 2002/0100052 A1 | 7/2002 | Daniels | 725/87 |
| 2002/0131428 A1 * | 9/2002 | Pecus et al. | 370/401 |
| 2002/0156783 A1 * | 10/2002 | Schwartz et al. | 707/9 |
| 2003/0039467 A1 | 2/2003 | Adolph et al. | 386/65 |
| 2003/0044166 A1 | 3/2003 | Haddad | 386/111 |
| 2003/0156824 A1 * | 8/2003 | Lu | 386/68 |
| 2005/0204385 A1 * | 9/2005 | Sull et al. | 725/45 |
| 2005/0229107 A1 * | 10/2005 | Hull et al. | 715/764 |

\* cited by examiner

*Primary Examiner* — Syling Yen
(74) *Attorney, Agent, or Firm* — Arthur Samodovitz; David A. Mins, Jr.; Robert V. Wilder (57) ABSTRACT

A method and implementing system are provided in which data, such as video and/or audio data, are presented and recorded on media for subsequent reference, management and/or processing. Original files are divided into segment files which are smaller than the original file. Each segment file may then be processed and/or viewed individually and, after viewing, the segment file is marked as having been viewed, and the marked segment files are immediately available for use in recording new files before all of the segmented files of the original file have been viewed. In one example, a user is enabled to select the size of the segmented files for any of the recorded, and/or scheduled to be recorded, data files.

23 Claims, 7 Drawing Sheets

FIG. 1

VIDEO DATABASE 401

| RECORDED VIDEOS | DATE RECORDED | SEGMENT # | SEGMENT SIZE | VIEWED |
|---|---|---|---|---|
| MOVIE A | JAN 3, 2004 | ORIGINAL | 60 MINUTES | 0 |
| MOVIE B | FEB 21, 2004 | 1 | 10 MINUTES | 1 |
| MOVIE B | | 2 | 10 MINUTES | 1 |
| MOVIE B | | 3 | 10 MINUTES | 1 |
| MOVIE B | | 4 | 10 MINUTES | 0 |
| MOVIE B | | 5 | 10 MINUTES | 0 |
| MOVIE B | | 6 | 10 MINUTES | 0 |
| NBA FINALS #7 | JUN 24, 2004 | ORIGINAL | 180 MINUTES | 0 |
| SUPER BOWL | JAN 28, 2004 | ORIGINAL | 240 MINUTES | 0 |

SEGMENTED PROCESSING OF DATA RECORDINGS

FIELD OF THE INVENTION

The present invention relates generally to information processing systems and more particularly to a methodology and implementation for segmenting data recordings for processing.

BACKGROUND OF THE INVENTION

With the increasing implementations of satellite and cable systems, more and more users are using digital video recording capabilities to record their favorite television shows and events. Many such recordings are of considerable length, and memory capacity for storing recorded events is limited. The number of events that may be saved is inversely proportional to the length of the events or programs that have been recorded. In many cases, when storage capacity has been used, new recordings cannot be made until recording space is freed-up from previously made recordings.

In current systems, each recorded program or event is kept as a single file. A user may begin to view a recorded program and then have to stop the viewing in order to tend to other matters. Such interruptions may occur quite frequently and over a period of days or even weeks. Thus, it may take a viewer several weeks to completely view an extended recording such as the final eight hours of a tennis tournament or the final day of a golf tournament. Since the entire recording is processed as a single file, the entire file is saved until the entire file has been viewed and erased. Until the recording being viewed has been completely viewed and erased, there may be no additional memory space available for recording new events or programs.

Similar shortcomings are also present in other recording systems, including but not limited to, digital audio recording systems where a limited amount of storage is available and recorded data files are maintained intact until the entire file is erased.

Thus, there is a need for an improved method and implementation for managing and processing recorded data files.

SUMMARY OF THE INVENTION

A method and implementing system are provided in which data, such as video and/or audio data, are presented and recorded on media for subsequent reference, management and/or processing. Original files are divided into segment files which are smaller than the original file. Each segment file may then be processed and/or viewed individually and, after viewing, the segment file is marked as having been viewed, and the marked segment files are immediately available for use in recording new files before all of the segmented files of the original file have been viewed. In one example, a user is enabled to select the size of the segmented files for any of the recorded, and/or scheduled to be recorded, data files.

BRIEF DESCRIPTION OF THE DRAWINGS

A better understanding of the present invention can be obtained when the following detailed description of a preferred embodiment is considered in conjunction with the following drawings, in which.

DETAILED DESCRIPTION

Although the present disclosure is presented in terms of a video recording system, it is understood that the invention also applies to other systems, including audio systems, in which data are recorded for later processing and management and storage space is limited.

Figure 1:
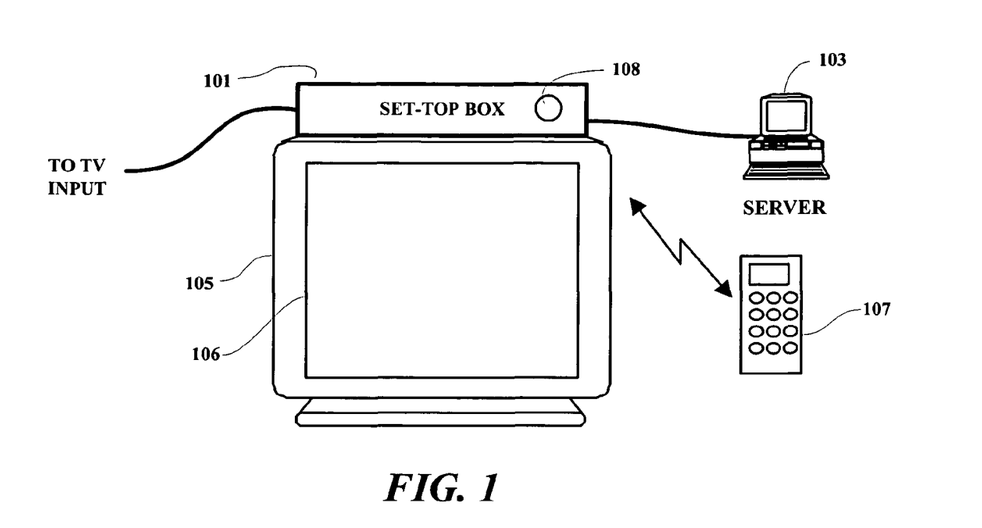
FIG. 1 is an illustration of an exemplary recording system including various components.

The various methods discussed herein may be implemented within an exemplary TV recording system which, as shown in FIG. 1, includes a TV set 105 and a control set-top control box 101. The set-top box 101 in the example is connected to a local area network (LAN) server 103 and is also connected to receive a TV input. The TV input may be connected to a cable system or directly to a TV dish receiver or other input system. Instead of a set-top box connected to a remote site as shown in the example, the present invention may also be implemented using a simpler stand-alone media player such as a DVD or CD player used in connection with a television set. Also shown in FIG. 1 is a remote control device 107 which is used to provide user input to the set-top box 101 and/or the TV unit 105. The remote unit 107 in the present example is an infrared (IR) device which communicates with the set-top box 101 through an IR sensor 108 located on the box 101. Other user input systems, such as touch-screen or joy stick input devices may also be used. The LAN server 103 is generally known in the art and is not presented here in any further detail in order not to obfuscate the disclosure of the present invention. The TV set 105 is arranged to display a video presentation which, through the use of the remote unit 107 and various selectively displayed menus, may be recorded for subsequent playing and viewing by the user. Recorded video and/or audio files may be stored locally at the user site, in user memory or other magnetic and/or optical media such as CDs, DVDs, VCRs or hard drives, and played locally from stand-alone devices such as DVD, CD or VCR players, or streamed-in from a server site as shown in the example. In any case, original audio and/or video files may be selectively divided into segment files by a user or by a server site, and, after viewing, each segment file is made available for use in recording new original files or file segments.

Figure 2:
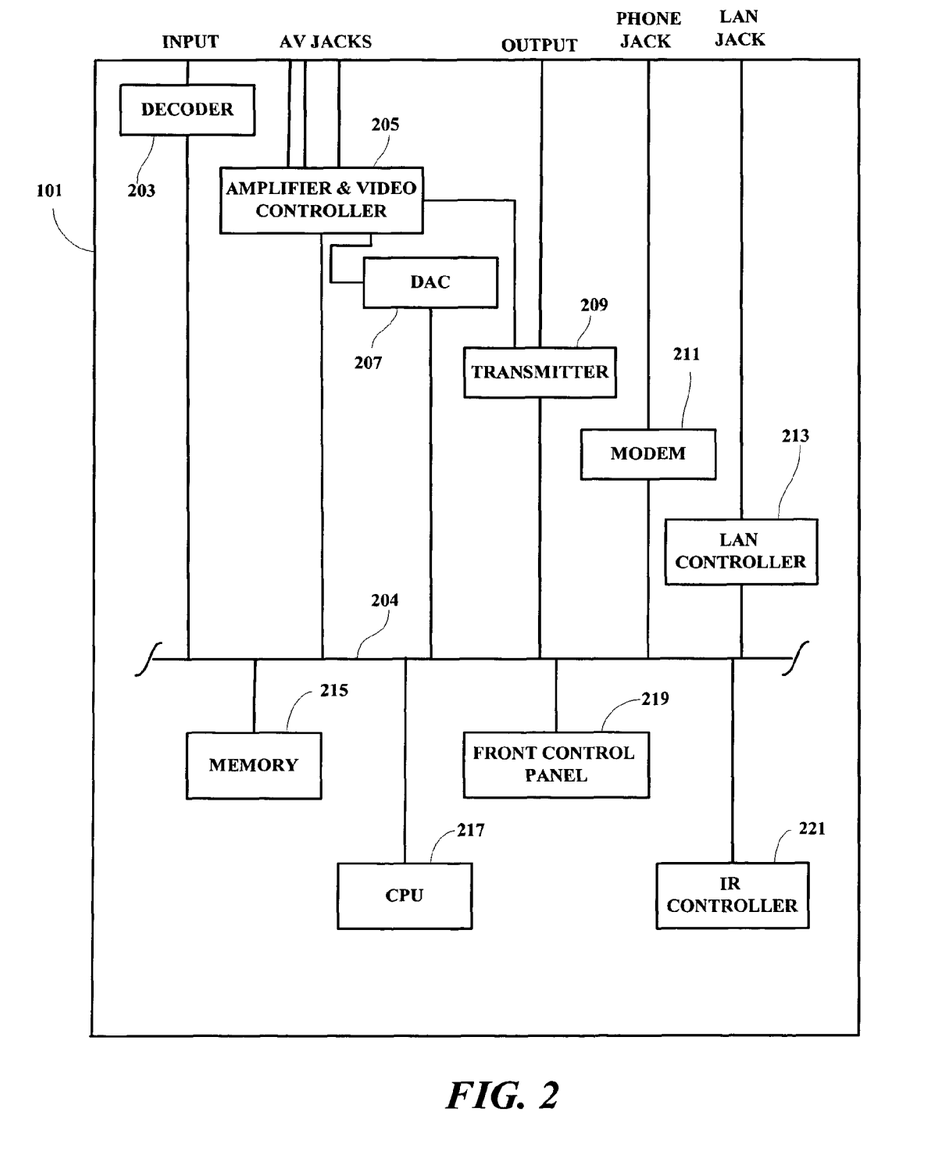
FIG. 2 is a schematic diagram of the TV set-top box shown in FIG. 1.

The contents of an exemplary embodiment of the set-top box 101 are shown in more detail in FIG. 2. As shown, the input is connected through a decoder 203 to a main bus 204. Audio/visual (AV) jacks are connected through an amplifier and video controller 205 to the bus 204. The AV jacks are arranged for being selectively connected to the TV 105. A digital-to-analog converter (DAC) 207 is arranged to receive inputs from the amplifier and video controller 205. The DAC 207 is also connected to the bus 204. A transmitter 209 is arranged to be selectively connected to the TV unit 105 through an OUTPUT terminal of the set-top box 101. The transmitter unit 209 is connected to the main bus 204 and also receives an input from the amplifier 205. A modem 211 and a LAN controller 213 are also separately connected between the bus 204 and respective output terminals of the set-top box 101. As shown, the bus 204 is also connected to memory device 215, at least one CPU 217, the front control panel 219 and an IR controller 221 which is used in connection with the remote control unit 107. The set-top box may include additional devices connected to the main bus 204 to enhance performance or provide additional functional capability.

The present invention enables the segmentation of audio, video or other data files into shorter segmented files for easier manipulation, viewing and management by a user. The shorter segmented files may be selectively viewed and the viewed files are marked as having been viewed. Thereafter, the segment files which have been marked as having been viewed are immediately available for use in recording new files before all of the file segments of the original file have been viewed. The segmentation process may be initiated by a user prior to making a recording, or while a file is being viewed or after a recording has already been made and stored.

Figure 3:
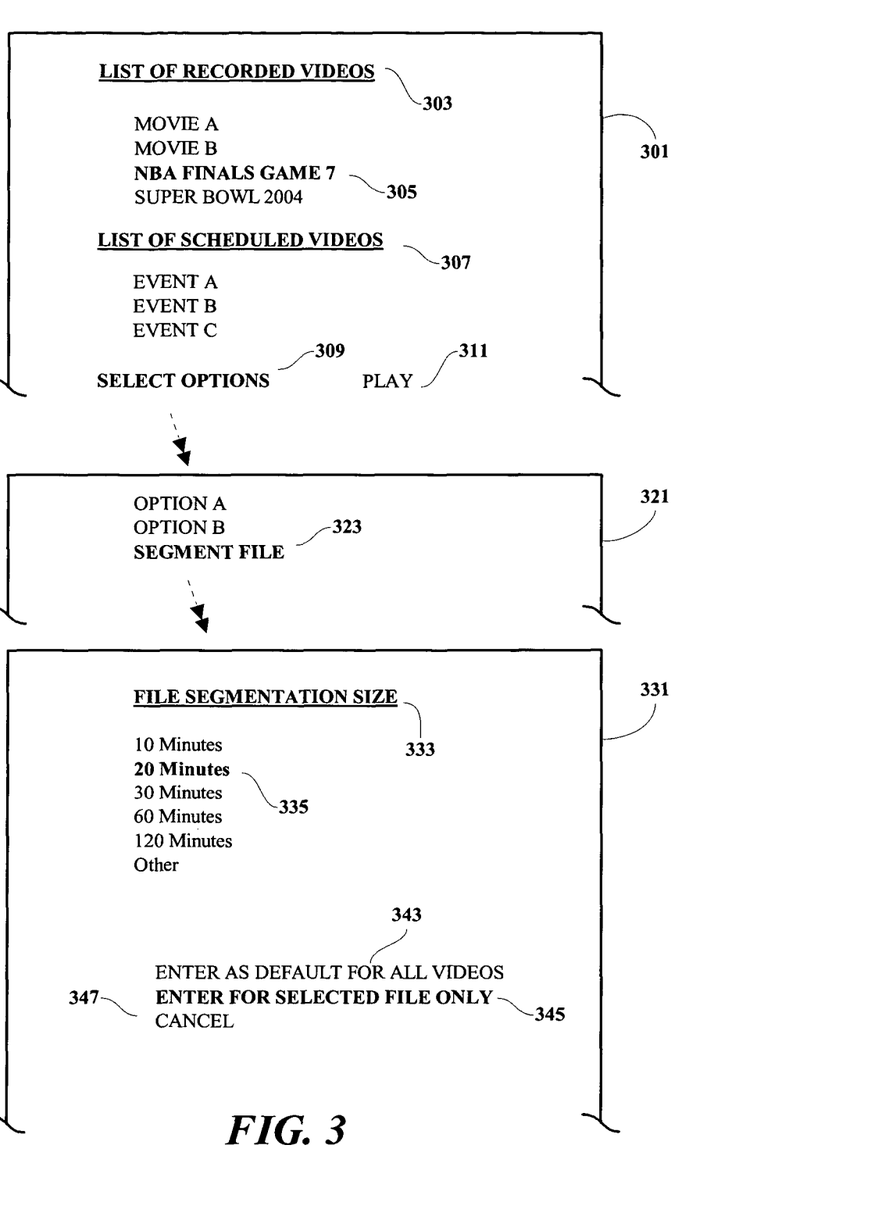
FIG. 3 is a series of selectively presented sequential screen menus which may be used in an exemplary embodiment of the present invention.

FIG. 3 illustrates a series of menu displays which may be presented and used in an exemplary embodiment of the present invention. As shown, a first menu screen 301 displays a list of videos 303 that have previously been recorded by a user, including a recording 305 of the "NBA FINALS GAME 7". The menu may also illustrate a list of videos 307 that have been scheduled for recording in the future, which includes Events A-C as shown. There is also a SELECT OPTIONS item 309 and a PLAY item 311. A user may select the NBA FINALS recording 305 (by using the remote unit 107 in conjunction with the displayed menu) and then select PLAY 311, and the NBA FINALS recording would be fetched from memory and played for viewing by the user. Unless the file 305 was earlier segmented by the user, when the user selects to play the file, the entire file will be played. Although the user may be able to pause the playing, or stop the playing and resume later at the same point in the recording, the entire recorded file will remain in memory until it is erased by the user. If memory is full at that time, no additional recording can be made until one of the recorded files has been erased by the user.

If a user chooses the SELECT OPTIONS menu item 309, then an options screen 321 will be presented to allow the user to select from several available options. If the user selects the SEGMENT FILE option 323, a SEGMENT FILE screen 331 will be presented to enable the user to make further selections from the presented menu. In the illustrated example, if the user wishes to segment the NBA file 305 into smaller segmented files in order to erase and free up memory space for other recordings as the NBA file is viewed, the user, in the example, is enabled to select the length or size of each segment file from the FILE SEGMENTATION SIZE menu 333. As shown, the user selects a segment file size of "20 Minutes" 335. This value is highlighted. The File Segment size refers to the size of the smaller segment files into which the larger recorded or original file will be divided amongst. As shown in the example, the NBA file 305, which may be three hours long, will be broken down or re-recorded into 20 minute segments or segment files. The user, after selecting the segment size 335, is enabled to select a menu item to enter the designated value of segment size as default values for all recorded videos 343. The user may also select to enter the designated value of segment size only for the selected video 345 or the user may choose to cancel the preceding operation entirely 347 in which case no value will be entered.

The user is also enabled to segment future recordings as they are recorded by highlighting the future recording from the list of scheduled recordings 307 prior to selecting the segment file options.

Figure 4:
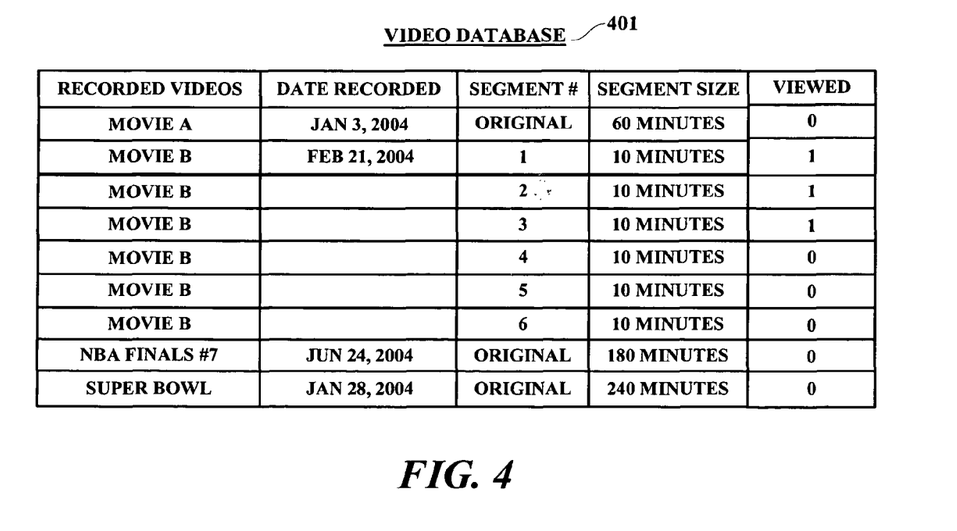
FIG. 4 is an exemplary database which may be used in association with the present invention.

All of the selections made by the user are stored in a database such as the video database 401 illustrated in FIG. 4. The video database may include the listing of the video recordings as well as the date recorded, segment number, segment size, and an entry indicating whether or not the particular segment has been viewed "1" or not yet viewed "0". Segments that include a "1" designation have already been viewed and the memory space used to contain these segments is made available (in addition to otherwise unused memory space) for use in making new recordings. Thus, by dividing lengthy original files into smaller chunks or segments of memory space, each segment may be returned to the memory space available pool for use in making new recordings as the original file is being played back in segments rather than as an entire indivisible file. The database may also include a scheduled video section (not shown) for scheduled future recordings. As illustrated in FIG. 4, Movie A is stored in its original format and has neither been segmented nor viewed. Movie B has been segmented into six 10 minute segments of which three segments have already been viewed an marked as having been viewed by having a "1" in the "VIEWED" column. Thus segments 1-3 of Movie B have been viewed and are available for use in recording new files. As hereinbefore noted, the database 401 may be maintained in user memory/storage or in server memory/storage.

Figure 5:
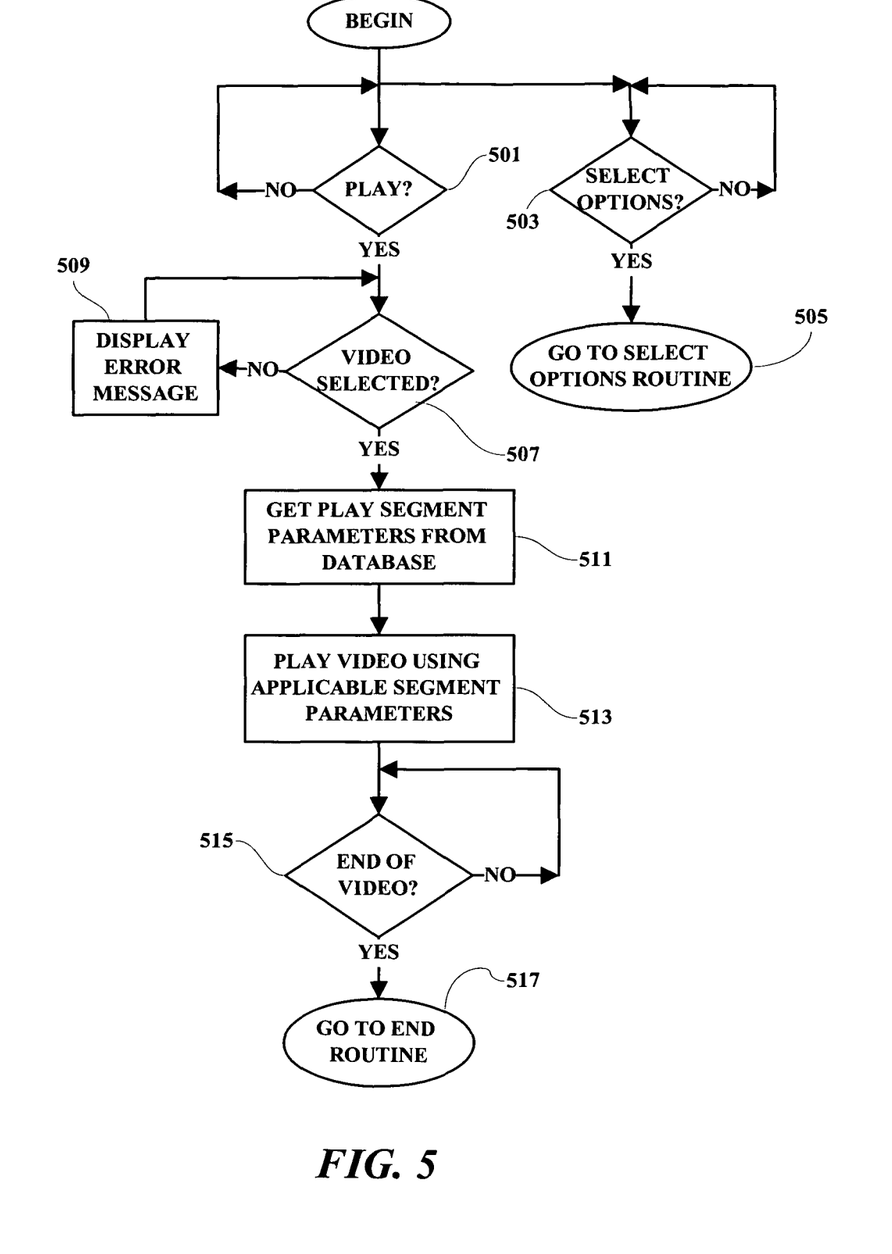
FIG. 5 is an exemplary flow chart illustrating an overall operational sequence in practicing the present invention.

As shown in FIG. 5, with reference to the menu screen 301, when a SELECT OPTIONS item 309 has been selected 503, the processing will execute a SELECT OPTIONS ROUTINE 505 as shown in FIG. 3. If, the PLAY item 311 is selected 501, a check is made to determine if a video file for example, has also been selected 507, and if no video file had been selected, then an error message is displayed to prompt the user to designate which video file is to be played. Once selected, the segment parameters for the selected video file are retrieved 511 and the video is played 513 in accordance with the segment parameters. For example, if Movie B were selected for playing, Movie B would be played in 10 minutes segments beginning with the first unviewed segment, segment #4 (see FIG. 4). If Movie A were selected for viewing, Movie A would be played in its entirety as a single unsegmented file. When the selected video has completed playing 515, the processing will go to an END ROUTINE which may, for example, solicit input from the user as to whether the user wishes to sign-off or view another recording.

Figure 6:
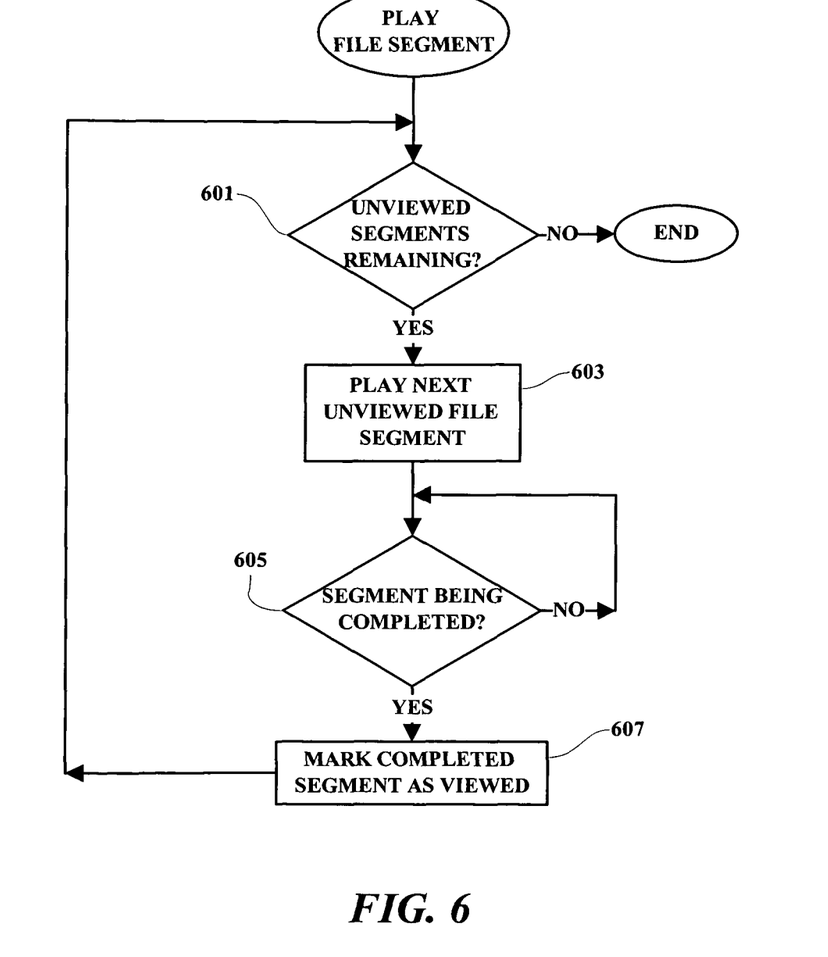
FIG. 6 is a flow chart illustrating a first aspect of the flow illustrated in FIG. 5.

In playing a segmented file, as shown in FIG. 6, the processing first determines if there are any unviewed segments remaining for the selected video 601. If there are no unviewed segments indicated in the database for the selected video 601, then an appropriate message may be displayed (not shown) and the processing ends. If the database indicates that unviewed segments are in storage for the selected video 601, then the process plays the next unviewed file segment 603, for example file segment #4 for Movie B. The playing of the segment is monitored and when it is determined that the currently playing segment is being completed 605, that segment is marked in the database as having been viewed 607 and the process checks for the next unviewed segment 601. When no further unviewed segments remain for the selected video, the process ends. It is preferred that the end of individual segments include some lead time reference to termination such that the next sequential segment begins to play seamlessly relative to a currently playing segment.

Figure 7:
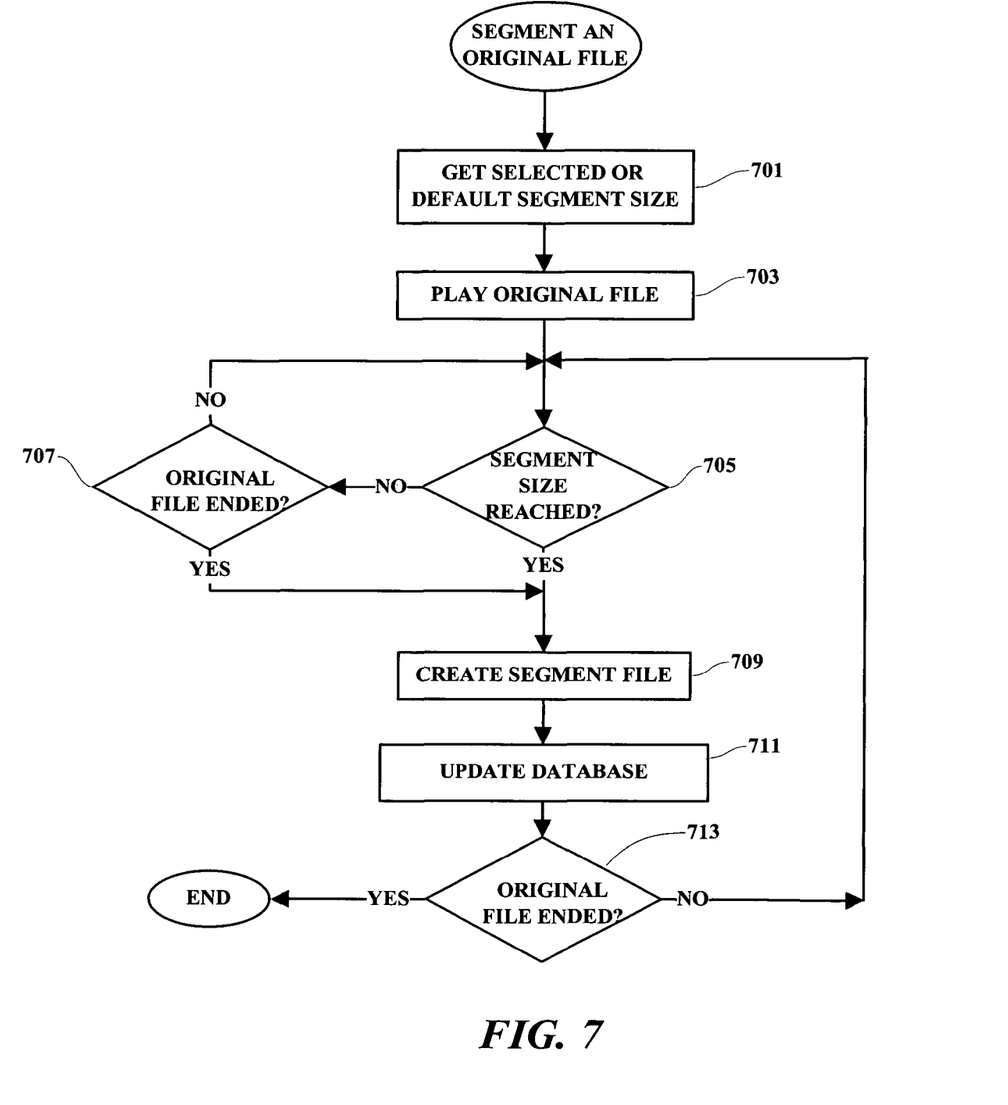
FIG. 7 is a flow chart illustrating an exemplary segmenting process in creating file segments in accordance with the present invention.

In FIG. 7, the segmenting process for an original file is illustrated. As shown, when a file is being segmented, the selected or default segment size is first retrieved from the database 701. The original file is then played 703. When the designated segment size has been reached 705, a segment file is created, and the database is updated 711. The creation of a segment file may be accomplished by creating a segment file reference and associating the corresponding memory locations for the beginning and the ending of the newly created segment file reference. Also, if an original file has ended before a segment size has been played 707, then a segment file is created or marked 709 (even though less than the designated segment size) and the database is updated 711. If the original file has ended 713 then the process ends. If the playing of the original file has not yet ended then after a segment file is created 709 and stored the database updated 711, the process returns to detect when the next segment size is reached 705.

Figure 8:
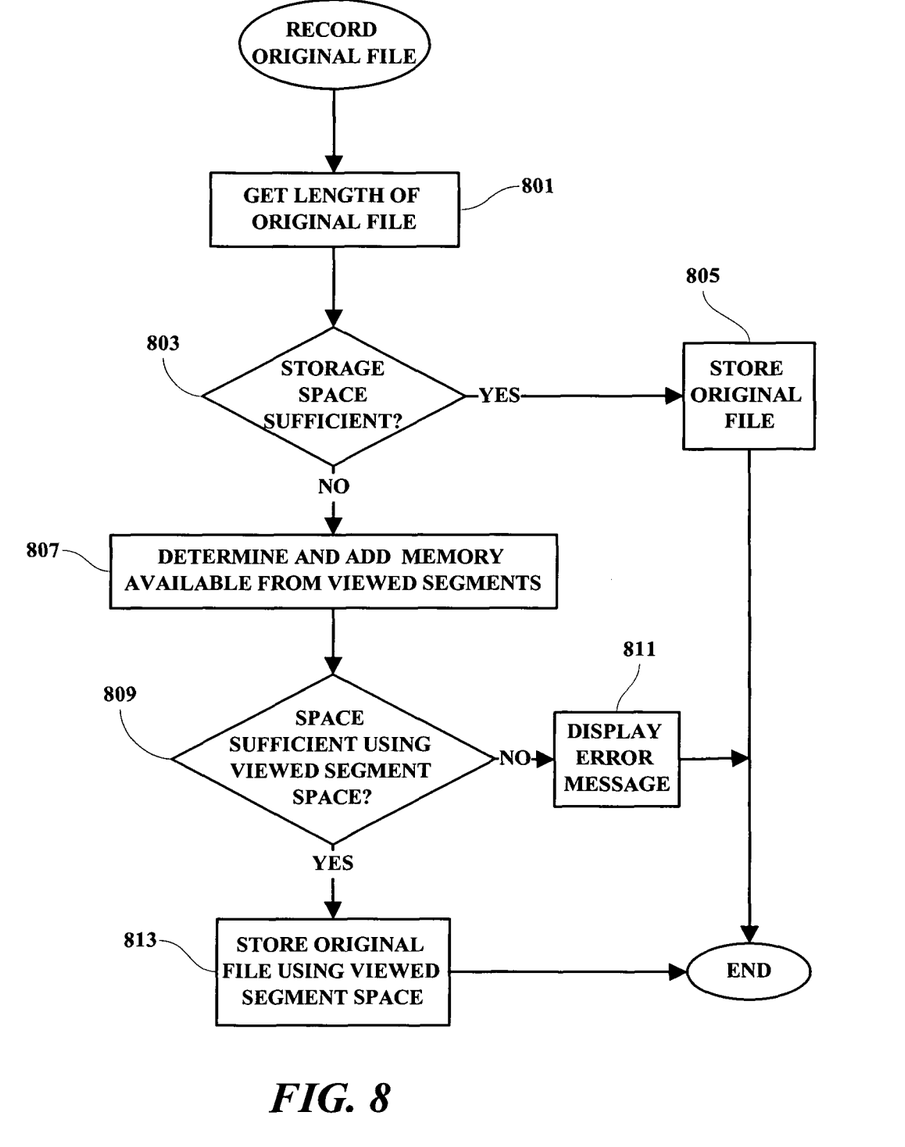
FIG. 8 is a flow chart illustrating an exemplary storage process which may be implemented in accordance with the present invention.

In using the memory space made available when a file segment has been viewed, the methodology illustrated in FIG. 8 may be implemented. As shown, before a requested recording is initiated, the length of the recording is obtained 801. This information is typically available and associated with the corresponding recording in a database or header. A check is then made to determine if existing storage space or memory is sufficient to record the original file 803. If there is sufficient storage or memory space available 803, then the original file is stored 805 and the process ends. If, however, there is insufficient memory or storage space available 803 to store the original file, then the amount of memory space that is available from viewed segment files is determined 807. If the use of the additional memory or storage space made available from viewed file segments is sufficient when added to memory or storage space otherwise available to contain the requested original file 809, then the requested original file is recorded using the memory space available 813 including the memory space made available through the deletion or writing over of previously stored file segments that have already been viewed. If there is insufficient memory space even with the added space contributed by the already viewed file segments 809, then an error or insufficient memory message is displayed 811 and the process ends.

The method and apparatus of the present invention has been described in connection with a preferred embodiment as disclosed herein. The disclosed methodology may be implemented in many different ways in order to accomplish the desired results as herein illustrated. Although an embodiment of the present invention has been shown and described in detail herein, along with certain variants thereof, many other varied embodiments that incorporate the teachings of the invention may be easily constructed by those skilled in the art, and even included or integrated into a processor or CPU or other larger system integrated circuit or chip. The disclosed methodology may be implemented partially or totally in program code stored on one of many possible media carriers, or other memory devices, from which it may be accessed and executed to achieve the beneficial results as described herein. Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. A method for enabling a processing system to process an un-segmented media file received by a user from a content provider, said un-segmented media file being arranged for being played by a media player, said method comprising:
    providing means for dividing said un-segmented media file into a plurality of segment files smaller than said un-segmented media file;
    providing a video database for listing un-segmented and segmented media files;
    providing means for playing individual selected ones of said segment files by said media player;
    marking each of said selected ones of said segment files after each of said selected ones of said segment files has been played by said media player, said marking being indicative that said selected one of said segment files has been played;
    maintaining said played segment files in memory after being played whereby said played segment files may be played again by said user;
    determining when additional memory space is needed to store a new un-segmented media file received by said user; and
    deleting one or more of said played segment files from memory in order to provide available memory space for said new un-segmented media file.

2. The method as set forth in claim 1 wherein said un-segmented media file is an audio file.

3. The method as set forth in claim 1 wherein said un-segmented media file contains both audio and video data.

4. The method as set forth in claim 1 and further including:
    providing means for selecting a segment size for said segment files.

5. The method as set forth in claim 1 and further including:
    displaying a listing of a plurality of said un-segmented media files; and
    providing means for selecting one or more of said un-segmented media files to divide into said plurality of segment files smaller than said un-segmented media file.

6. The method as set forth in claim 1 and further including:
    providing means for storing a plurality of said un-segmented media files; and
    providing means for selecting a segment size as a default segment size for all of said plurality of said segment files.

7. The method as set forth in claim 1 and further including:
    providing means for designating future recordings of un-segmented media files whereby said designated future recordings are made at predetermined dates and times as selected by said user.

8. The method as set forth in claim 7 wherein said un-segmented media files are divided into said segment files at a time said designated future recordings are made.

9. The method as set forth in claim 7 wherein said un-segmented media files are divided into said segment files at a time after said designated future recordings are made.

10. The method as set forth in claim 1 wherein said method is accomplished by processing means located at a server site coupled to and remote from a user terminal.

11. The method as set forth in claim 1 wherein said method is accomplished by processing means located at a user terminal.

12. A storage medium including machine readable coded indicia, said storage medium being selectively coupled to a reading device, said reading device being selectively coupled to processing circuitry, said reading device being selectively operable to read said machine readable coded indicia and provide program signals representative thereof, said program signals being operable to effect a processing of an un-segmented media file received by a user as a single file from a content provider, said un-segmented media file being arranged for being played by a media player, said program signals being further selectively operable to accomplish the steps of:

dividing said un-segmented media file into a plurality of segment files smaller than said un-segmented media file;

providing a video database for listing un-segmented and segmented media files;

playing individual selected ones of said segment files by said media player;

marking each of said selected ones of said segment files after each of said selected ones of said segment files has been played by said media player, said marking being indicative that said selected one of said segment files has been played;

maintaining said played segment files in memory after being played whereby said played segment files may be played again by said user;

determining when additional memory space is needed to store a new un-segmented media file received by said user; and     deleting one or more of said played segment files from memory in order to provide available memory space for said new un-segmented media file.

13. The medium as set forth in claim 12 wherein said un-segmented media file is an audio file.

14. The medium as set forth in claim 12 wherein said un-segmented media file contains both audio and video data.

15. The medium as set forth in claim 12 wherein said program signals are further effective for:

selecting a segment size for said segment files.

16. The medium as set forth in claim 12 wherein said program signals are further effective for:

displaying a listing of a plurality of said un-segmented media files; and     selecting one or more of said un-segmented media files to divide into said plurality of segment files smaller than said un-segmented media file.

17. The medium as set forth in claim 12 wherein said program signals are further effective for:

storing a plurality of said un-segmented media files; and     selecting a segment size as a default segment size for all of said plurality of said segment files.

18. The medium as set forth in claim 12 wherein said program signals are further effective for:

responding to a user input to designate future recordings of un-segmented media files whereby said designated future recordings are made at predetermined dates and times as selected by said user.

19. The medium as set forth in claim 18 wherein said un-segmented media files are divided into said segment files at a time said designated future recordings are made.

20. The medium as set forth in claim 18 wherein said un-segmented media files are divided into said segment files at a time after said designated future recordings are made.

21. The medium as set forth in claim 12 wherein said processing is accomplished by processing means located at a server site coupled to and remote from a user terminal.

22. The medium as set forth in claim 12 wherein said processing is accomplished by processing means located at a user terminal.

23. A processing system to process an un-segmented media file received by a user from a content provider, said un-segmented media file being arranged for being played by a media player, said processing system comprising:

means for dividing said un-segmented media file into a plurality of segment files smaller than said un-segmented media file;

means for providing a video database for listing un-segmented and segmented media files;

means for playing individual selected ones of said segment files by said media player;

means for marking each of said selected ones of said segment files after each of said selected ones of said segment files has been played by said media player, said marking being indicative that said selected one of said segment files has been played;

means for maintaining said played segment files in memory after being played whereby said played segment files may be played again by said user;

means for determining when additional memory space is needed to store a new un-segmented media file received by said user; and     means for deleting one or more of said played segment files from memory in order to provide available memory space for said new un-segmented media file.

\* \* \* \* \*